(12) United States Patent
Frohna et al.

(10) Patent No.: US 8,289,959 B2
(45) Date of Patent: Oct. 16, 2012

(54) METHOD AND SYSTEM FOR PROCESSING DATA

(75) Inventors: Michael Frohna, Sachsenheim (DE); Kai Roettger, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 200 days.

(21) Appl. No.: 12/294,158

(22) PCT Filed: Feb. 26, 2007

(86) PCT No.: PCT/EP2007/051798
§ 371 (c)(1),
(2), (4) Date: Jul. 13, 2009

(87) PCT Pub. No.: WO2007/107432
PCT Pub. Date: Sep. 27, 2007

(65) Prior Publication Data
US 2010/0046539 A1    Feb. 25, 2010

(30) Foreign Application Priority Data
Mar. 23, 2006    (DE) .......................... 10 2006 013 872

(51) Int. Cl.
*H04L 12/28* (2006.01)
(52) U.S. Cl. ........................................ 370/389; 370/474
(58) Field of Classification Search .................. 370/252, 370/389, 465, 474, 476, 438
See application file for complete search history.

(56) References Cited

U.S. PATENT DOCUMENTS

| | | | |
|---|---|---|---|
| 4,237,553 A | 12/1980 | Larsen | |
| 5,499,247 A | 3/1996 | Matsuda et al. | |
| 6,654,346 B1 * | 11/2003 | Mahalingaiah et al. | 370/235 |
| 6,865,160 B1 * | 3/2005 | Bare | 370/256 |
| 6,930,958 B2 * | 8/2005 | Goergen | 368/10 |
| 7,363,341 B2 * | 4/2008 | Koshino et al. | 709/203 |
| 7,376,521 B2 * | 5/2008 | James et al. | 702/45 |
| 7,490,163 B2 * | 2/2009 | Ekstrom et al. | 709/238 |
| 7,539,193 B2 * | 5/2009 | Pfeffer et al. | 370/392 |
| 7,649,912 B2 * | 1/2010 | Balasubramanian et al. | 370/509 |
| 7,715,398 B2 * | 5/2010 | Guo et al. | 370/392 |
| 2003/0070019 A1 | 4/2003 | Dalakuras et al. | |
| 2005/0131852 A1 | 6/2005 | Berwanger et al. | |
| 2005/0135244 A1 * | 6/2005 | Miller et al. | 370/229 |
| 2007/0002836 A1 * | 1/2007 | Lindner | 370/352 |

FOREIGN PATENT DOCUMENTS

| | | |
|---|---|---|
| EP | 0 399 491 | 11/1990 |
| EP | 0 503 212 | 9/1992 |
| EP | 1 298 849 | 4/2003 |
| JP | 1-171336 | 7/1989 |
| JP | 3-250830 | 11/1991 |
| JP | 5-134990 | 6/1993 |
| JP | 2005-513959 | 5/2005 |
| WO | WO 03/056764 | 7/2003 |

OTHER PUBLICATIONS

International Search Report, PCT/EP2007/051798, dated May 29, 2007.

* cited by examiner

*Primary Examiner* — Ricky Ngo
*Assistant Examiner* — Christine Ng
(74) *Attorney, Agent, or Firm* — Kenyon & Kenyon LLP

(57) ABSTRACT

In a system and a method for real time transmission between modules that are serially connected to one another, each module embeds its useful data in a data packet received by a preconnected module, which has a data packet number, if a comparison value formed as a function of the data packet number agrees with an identification number (frameID) that is provided in the module.

6 Claims, 31 Drawing Sheets

Stand der Technik

Fig. 9.1

```
FrameMask =    1
================
                            1          2          3
FrameNumber     01234567890123456789012345678901
FrameID =   0   x_x_x_x_x_x_x_x_x_x_x_x_x_x_x_x_
FrameID =   1   _x_x_x_x_x_x_x_x_x_x_x_x_x_x_x_x
```
* * * * * * * * * * * * * * * * * * * * * * * * * * * * * * * * *

Fig. 9.2

```
FrameMask =    2
================
                            1          2          3
FrameNumber     01234567890123456789012345678901
FrameID =   0   xx__xx__xx__xx__xx__xx__xx__xx__
FrameID =   1   _____
FrameID =   2   __xx__xx__xx__xx__xx__xx__xx__xx
```
* * * * * * * * * * * * * * * * * * * * * * * * * * * * * * * * *

Fig. 9.3

```
FrameMask =    3
================
                            1          2          3
FrameNumber     01234567890123456789012345678901
FrameID =   0   x___x___x___x___x___x___x___x___
FrameID =   1   _x___x___x___x___x___x___x___x__
FrameID =   2   __x___x___x___x___x___x___x___x_
FrameID =   3   ___x___x___x___x___x___x___x___x
```
* * * * * * * * * * * * * * * * * * * * * * * * * * * * * * * * *

Fig. 9.4

```
FrameMask =    4
================
                            1          2          3
FrameNumber     01234567890123456789012345678901
FrameID =   0   xxxx____xxxx____xxxx____xxxx____
FrameID =   1   _____
FrameID =   2   _____
FrameID =   3   _____
FrameID =   4   ____xxxx____xxxx____xxxx____xxxx
```
* * * * * * * * * * * * * * * * * * * * * * * * * * * * * * * * *

Fig. 9.5

```
FrameMask =    5
================
                            1          2          3
FrameNumber     01234567890123456789012345678901
FrameID =   0   x_x_____x_x_____x_x_____x_x_____
FrameID =   1   _x_x_____x_x_____x_x_____x_x____
FrameID =   2   _____
FrameID =   3   _____
FrameID =   4   ____x_x_____x_x_____x_x_____x_x_
FrameID =   5   _____x_x_____x_x_____x_x_____x_x
```
* * * * * * * * * * * * * * * * * * * * * * * * * * * * * * * * *

Fig. 9.6

```
FrameMask =    6
================
                          1         2         3
FrameNumber    01234567890123456789012345678901

FrameID =   0  xx      xx      xx      xx
FrameID =   1
FrameID =   2   xx      xx      xx      xx
FrameID =   3
FrameID =   4    xx      xx      xx      xx
FrameID =   5
FrameID =   6     xx      xx      xx      xx
```
\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Fig. 9.7

```
FrameMask =    7
================
                          1         2         3
FrameNumber    01234567890123456789012345678901

FrameID =   0  x       x       x       x
FrameID =   1   x       x       x       x
FrameID =   2    x       x       x       x
FrameID =   3     x       x       x       x
FrameID =   4      x       x       x       x
FrameID =   5       x       x       x       x
FrameID =   6        x       x       x       x
FrameID =   7         x       x       x       x
```
\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Fig. 9.8

```
FrameMask =    8
================
                          1         2         3
FrameNumber    01234567890123456789012345678901

FrameID =   0  xxxxxxxx        xxxxxxxx
FrameID =   1
FrameID =   2
FrameID =   3
FrameID =   4
FrameID =   5
FrameID =   6
FrameID =   7
FrameID =   8          xxxxxxxx        xxxxxxxx
```
\*\*\*\*\*\*\*\*\*\*\*\*\*\*\*\*\*\*\*\*\*\*\*\*\*\*\*\*\*\*\*\*\*\*\*\*\*\*\*\*\*\*\*\*

Fig. 9.9

```
FrameMask =   9
===============
                              1         2         3
FrameNumber   01234567890123456789012345678901

FrameID =   0   x_x_x_x_____x_x_x_x_____
FrameID =   1   _x_x_x_x_____x_x_x_x_____
FrameID =   2   _____
FrameID =   3   _____
FrameID =   4   _____
FrameID =   5   _____
FrameID =   6   _____
FrameID =   7   _____
FrameID =   8   _____x_x_x_x_____x_x_x_x_
FrameID =   9   _____x_x_x_x_____x_x_x_x
```
*****************************************

Fig. 9.10

```
FrameMask =   10
================
                              1         2         3
FrameNumber   01234567890123456789012345678901

FrameID =   0   xx__xx_____xx__xx_____
FrameID =   1   _____
FrameID =   2   _xx__xx_____xx__xx_____
FrameID =   3   _____
FrameID =   4   _____
FrameID =   5   _____
FrameID =   6   _____
FrameID =   7   _____
FrameID =   8   _____xx__xx_____xx__xx
FrameID =   9   _____
FrameID =   10  _____xx__xx_____xx__xx
```
*****************************************

Fig. 9.11

```
FrameMask =   11
================
                              1         2         3
FrameNumber   01234567890123456789012345678901

FrameID =   0   x___x_____x___x_____
FrameID =   1   _x___x_____x___x_____
FrameID =   2   __x___x_____x___x_____
FrameID =   3   ___x___x_____x___x_____
FrameID =   4   _____
FrameID =   5   _____
FrameID =   6   _____
FrameID =   7   _____
FrameID =   8   _____x___x_____x___x___
FrameID =   9   _____x___x_____x___x__
FrameID =   10  _____x___x_____x___x_
FrameID =   11  _____x___x_____x___x
```
*****************************************

Fig. 9.12

```
FrameMask =   12
===============
                              1         2         3
FrameNumber     01234567890123456789012345678901

FrameID =    0  xxxx_____xxxx_____
FrameID =    1  _____
FrameID =    2  _____
FrameID =    3  _____
FrameID =    4  ____xxxx_____xxxx_____
FrameID =    5  _____
FrameID =    6  _____
FrameID =    7  _____
FrameID =    8  _____xxxx_____xxxx____
FrameID =    9  _____
FrameID =   10  _____
FrameID =   11  _____
FrameID =   12  _____xxxx_____xxxx

```
FrameMask =   13
===============
                              1         2         3
FrameNumber     01234567890123456789012345678901

FrameID =    0  x_x_____x_x_____
FrameID =    1  _x_x_____x_x_____
FrameID =    2  _____
FrameID =    3  _____
FrameID =    4  ____x_x_____x_x_____
FrameID =    5  ____ x_x_____x_x_____
FrameID =    6  _____
FrameID =    7  _____
FrameID =    8  _____x_x_____x_x_____
FrameID =    9  _____ x_x_____x_x____
FrameID =   10  _____
FrameID =   11  _____
FrameID =   12  _____x_x_____x_x_
FrameID =   13  _____x_x_____x_x

*********************************************
```

```
FrameMask =   14
===============
                              1         2         3
FrameNumber   01234567890123456789012345678901
FrameID =  0  xx_____xx_____
FrameID =  1  _____
FrameID =  2  __xx_____xx_____
FrameID =  3  _____
FrameID =  4  ___xx_____xx_____
FrameID =  5  _____
FrameID =  6  ____xx_____xx_____
FrameID =  7  _____
FrameID =  8  _____xx_____xx_____
FrameID =  9  _____
FrameID = 10  _____xx_____xx_____
FrameID = 11  _____
FrameID = 12  _____xx_____xx_____
FrameID = 13  _____
FrameID = 14  _____xx_____xx_____
*********************************************
FrameMask =   15
===============
                              1         2         3
FrameNumber   01234567890123456789012345678901
FrameID =  0  x_____x_____
FrameID =  1  _x_____x_____
FrameID =  2  __x_____x_____
FrameID =  3  ___x_____x_____
FrameID =  4  ____x_____x_____
FrameID =  5  _____x_____x_____
FrameID =  6  _____x_____x_____
FrameID =  7  _____x_____x_____
FrameID =  8  _____x_____x_____
FrameID =  9  _____x_____x_____
FrameID = 10  _____x_____x_____
FrameID = 11  _____x_____x____
FrameID = 12  _____x_____x___
FrameID = 13  _____x_____x__
FrameID = 14  _____x_____x_
FrameID = 15  _____x_____x
*********************************************
```

```
FrameMask =   16
===============
                                1         2         3
FrameNumber   01234567890123456789012345678901

FrameID =   0   xxxxxxxxxxxxxxxx_____
FrameID =   1   _____
FrameID =   2   _____
FrameID =   3   _____
FrameID =   4   _____
FrameID =   5   _____
FrameID =   6   _____
FrameID =   7   _____
FrameID =   8   _____
FrameID =   9   _____
FrameID =  10   _____
FrameID =  11   _____
FrameID =  12   _____
FrameID =  13   _____
FrameID =  14   _____
FrameID =  15   _____
FrameID =  16   _____xxxxxxxxxxxxxxxx

*******************************************

FrameMask =   17
===============
                                1         2         3
FrameNumber   01234567890123456789012345678901

FrameID =   0   x_x_x_x_x_x_x_x_____
FrameID =   1   _x_x_x_x_x_x_x_x_____
FrameID =   2   _____
FrameID =   3   _____
FrameID =   4   _____
FrameID =   5   _____
FrameID =   6   _____
FrameID =   7   _____
FrameID =   8   _____
FrameID =   9   _____
FrameID =  10   _____
FrameID =  11   _____
FrameID =  12   _____
FrameID =  13   _____
FrameID =  14   _____
FrameID =  15   _____
FrameID =  16   _____x_x_x_x_x_x_x_x_
FrameID =  17   _____x_x_x_x_x_x_x_x

```
FrameMask =  18
===============
                                1         2         3
FrameNumber     01234567890123456789012345678901

FrameID =    0  xx__xx__xx__xx_____
FrameID =    1  _____
FrameID =    2  _xx__xx__xx__xx_____
FrameID =    3  _____
FrameID =    4  _____
FrameID =    5  _____
FrameID =    6  _____
FrameID =    7  _____
FrameID =    8  _____
FrameID =    9  _____
FrameID =   10  _____
FrameID =   11  _____
FrameID =   12  _____
FrameID =   13  _____
FrameID =   14  _____
FrameID =   15  _____
FrameID =   16  _____xx__xx__xx__xx__
FrameID =   17  _____
FrameID =   18  _____xx__xx__xx__xx_

*****************************************

FrameMask =  19
===============
                                1         2         3
FrameNumber     01234567890123456789012345678901

FrameID =    0  x___x___x___x_____
FrameID =    1  _x___x___x___x_____
FrameID =    2  __x___x___x___x_____
FrameID =    3  ___x___x___x___x_____
FrameID =    4  _____
FrameID =    5  _____
FrameID =    6  _____
FrameID =    7  _____
FrameID =    8  _____
FrameID =    9  _____
FrameID =   10  _____
FrameID =   11  _____
FrameID =   12  _____
FrameID =   13  _____
FrameID =   14  _____
FrameID =   15  _____
FrameID =   16  _____x___x___x___x___
FrameID =   17  _____x___x___x___x__
FrameID =   18  _____x___x___x___x_
FrameID =   19  _____x___x___x___x

```
FrameMask =  20
==============                1         2         3
FrameNumber   01234567890123456789012345678901

FrameID =   0  xxxx____xxxx_____
FrameID =   1  _____
FrameID =   2  _____
FrameID =   3  _____
FrameID =   4  ____xxxx____xxxx_____
FrameID =   5  _____
FrameID =   6  _____
FrameID =   7  _____
FrameID =   8  _____
FrameID =   9  _____
FrameID =  10  _____
FrameID =  11  _____
FrameID =  12  _____
FrameID =  13  _____
FrameID =  14  _____
FrameID =  15  _____
FrameID =  16  _____xxxx____xxxx___
FrameID =  17  _____
FrameID =  18  _____
FrameID =  19  _____
FrameID =  20  _____xxxx____xxxx

```
FrameMask =  21
==============                1         2         3
FrameNumber   01234567890123456789012345678901

FrameID =   0  x_x_____x_x_____
FrameID =   1  _x_x____x_x_____
FrameID =   2  _____
FrameID =   3  _____
FrameID =   4  ____x_x_____x_x_____
FrameID =   5  _____x_x____x_x_____
FrameID =   6  _____
FrameID =   7  _____
FrameID =   8  _____
FrameID =   9  _____
FrameID =  10  _____
FrameID =  11  _____
FrameID =  12  _____
FrameID =  13  _____
FrameID =  14  _____
FrameID =  15  _____
FrameID =  16  _____x_x_____x_x____
FrameID =  17  _____x_x____x_x____
FrameID =  18  _____
FrameID =  19  _____
FrameID =  20  _____x_x_____x_x
FrameID =  21  _____x_x____x_x

```
FrameMask =    22
===============
                          1         2         3
FrameNumber   01234567890123456789012345678901

FrameID =    0   xx        xx
FrameID =    1
FrameID =    2    xx        xx
FrameID =    3
FrameID =    4     xx        xx
FrameID =    5
FrameID =    6      xx        xx
FrameID =    7
FrameID =    8
FrameID =    9
FrameID =   10
FrameID =   11
FrameID =   12
FrameID =   13
FrameID =   14
FrameID =   15
FrameID =   16              xx        xx
FrameID =   17
FrameID =   18               xx        xx
FrameID =   19
FrameID =   20                xx        xx
FrameID =   21
FrameID =   22                 xx        xx

```
FrameMask =   23
==============
                              1         2         3
FrameNumber    01234567890123456789012345678901
FrameID =    0  x____x_____
FrameID =    1  _x____x_____
FrameID =    2  __x____x_____
FrameID =    3  ___x____x_____
FrameID =    4  ____x____x_____
FrameID =    5  _____x____x_____
FrameID =    6  _____x____x_____
FrameID =    7  _____x____x_____
FrameID =    8  _____
FrameID =    9  _____
FrameID =   10  _____
FrameID =   11  _____
FrameID =   12  _____
FrameID =   13  _____
FrameID =   14  _____
FrameID =   15  _____
FrameID =   16  _____x____x_____
FrameID =   17  _____x____x_____
FrameID =   18  _____x____x_____
FrameID =   19  _____x____x_____
FrameID =   20  _____x____x_____
FrameID =   21  _____x____x_____
FrameID =   22  _____x____x____
FrameID =   23  _____x____x___
********************************************
```

Fig. 9.24

```
FrameMask =   24
===============
                              1         2         3
FrameNumber   01234567890123456789012345678901

FrameID =   0   xxxxxxxx_____
FrameID =   1   _____
FrameID =   2   _____
FrameID =   3   _____
FrameID =   4   _____
FrameID =   5   _____
FrameID =   6   _____
FrameID =   7   _____
FrameID =   8   _____xxxxxxxx_____
FrameID =   9   _____
FrameID =  10   _____
FrameID =  11   _____
FrameID =  12   _____
FrameID =  13   _____
FrameID =  14   _____
FrameID =  15   _____
FrameID =  16   _____xxxxxxxx_____
FrameID =  17   _____
FrameID =  18   _____
FrameID =  19   _____
FrameID =  20   _____
FrameID =  21   _____
FrameID =  22   _____
FrameID =  23   _____
FrameID =  24   _____xxxxxxxx
*********************************************
```

Fig. 9.25

```
FrameMask =   25
============              1         2         3
FrameNumber   01234567890123456789012345678901
FrameID =  0  x_x_x_x_____
FrameID =  1  _x_x_x_x_____
FrameID =  2  _____
FrameID =  3  _____
FrameID =  4  _____
FrameID =  5  _____
FrameID =  6  _____
FrameID =  7  _____
FrameID =  8  _____x_x_x_x_____
FrameID =  9  _____x_x_x_x_____
FrameID = 10  _____
FrameID = 11  _____
FrameID = 12  _____
FrameID = 13  _____
FrameID = 14  _____
FrameID = 15  _____
FrameID = 16  _____x_x_x_x_____
FrameID = 17  _____x_x_x_x_____
FrameID = 18  _____
FrameID = 19  _____
FrameID = 20  _____
FrameID = 21  _____
FrameID = 22  _____
FrameID = 23  _____
FrameID = 24  _____x_x_x_x_
FrameID = 25  _____x_x_x_x
********************************************
```

Fig. 9.26

```
FrameMask =   26
===============
                                   1         2         3
FrameNumber    0123456789012345678901234567890 1
FrameID =   0  xx__xx_____
FrameID =   1  _____
FrameID =   2  __xx__xx_____
FrameID =   3  _____
FrameID =   4  _____
FrameID =   5  _____
FrameID =   6  _____
FrameID =   7  _____
FrameID =   8  _____xx__xx_____
FrameID =   9  _____
FrameID =  10  _____xx__xx_____
FrameID =  11  _____
FrameID =  12  _____
FrameID =  13  _____
FrameID =  14  _____
FrameID =  15  _____
FrameID =  16  _____xx__xx_____
FrameID =  17  _____
FrameID =  18  _____xx__xx_____
FrameID =  19  _____
FrameID =  20  _____
FrameID =  21  _____
FrameID =  22  _____
FrameID =  23  _____
FrameID =  24  _____xx__xx_
FrameID =  25  _____
FrameID =  26  _____xx__xx

```
FrameMask =   27
==============
                                    1         2         3
FrameNumber     01234567890123456789012345678901
FrameID =   0   x   x
FrameID =   1    x   x
FrameID =   2     x   x
FrameID =   3      x   x
FrameID =   4
FrameID =   5
FrameID =   6
FrameID =   7
FrameID =   8           x   x
FrameID =   9            x   x
FrameID =  10             x   x
FrameID =  11              x   x
FrameID =  12
FrameID =  13
FrameID =  14
FrameID =  15
FrameID =  16                      x   x
FrameID =  17                       x   x
FrameID =  18                        x   x
FrameID =  19                         x   x
FrameID =  20
FrameID =  21
FrameID =  22
FrameID =  23
FrameID =  24                                x   x
FrameID =  25                                 x   x
FrameID =  26                                  x   x
FrameID =  27                                   x   x
********************************************
```

Fig. 9.28

```
FrameMask =   28
================
                             1         2         3
FrameNumber    0123456789012345678901234567890 1
FrameID =    0  xxxx_____
FrameID =    1  _____
FrameID =    2  _____
FrameID =    3  _____
FrameID =    4  ____xxxx_____
FrameID =    5  _____
FrameID =    6  _____
FrameID =    7  _____
FrameID =    8  _____xxxx_____
FrameID =    9  _____
FrameID =   10  _____
FrameID =   11  _____
FrameID =   12  _____xxxx_____
FrameID =   13  _____
FrameID =   14  _____
FrameID =   15  _____
FrameID =   16  _____xxxx_____
FrameID =   17  _____
FrameID =   18  _____
FrameID =   19  _____
FrameID =   20  _____xxxx_____
FrameID =   21  _____
FrameID =   22  _____
FrameID =   23  _____
FrameID =   24  _____xxxx___
FrameID =   25  _____
FrameID =   26  _____
FrameID =   27  _____
FrameID =   28  _____xxxx

```
FrameMask =   29
===============
                            1         2         3
FrameNumber     0123456789012345678901234567890 1
FrameID =    0  x_x
FrameID =    1  _x_x
FrameID =    2
FrameID =    3
FrameID =    4     x_x
FrameID =    5     _x_x
FrameID =    6
FrameID =    7
FrameID =    8        x_x
FrameID =    9        _x_x
FrameID =   10
FrameID =   11
FrameID =   12           x_x
FrameID =   13           _x_x
FrameID =   14
FrameID =   15
FrameID =   16              x_x
FrameID =   17              _x_x
FrameID =   18
FrameID =   19
FrameID =   20                 x_x
FrameID =   21                 _x_x
FrameID =   22
FrameID =   23
FrameID =   24                    x_x
FrameID =   25                    _x_x
FrameID =   26
FrameID =   27
FrameID =   28                       x_x
FrameID =   29                       _x_x
****************************************
```

Fig. 9.30

```
FrameMask =    30
===============
                                1         2         3
FrameNumber    0123456789012345678901234567890 1
FrameID =      0    xx_____
FrameID =      1    _____
FrameID =      2    _xx_____
FrameID =      3    _____
FrameID =      4    __xx_____
FrameID =      5    _____
FrameID =      6    ___xx_____
FrameID =      7    _____
FrameID =      8    ____xx_____
FrameID =      9    _____
FrameID =     10    _____xx_____
FrameID =     11    _____
FrameID =     12    _____xx_____
FrameID =     13    _____
FrameID =     14    _____xx_____
FrameID =     15    _____
FrameID =     16    _____xx_____
FrameID =     17    _____
FrameID =     18    _____xx_____
FrameID =     19    _____
FrameID =     20    _____xx_____
FrameID =     21    _____
FrameID =     22    _____xx_____
FrameID =     23    _____
FrameID =     24    _____xx_____
FrameID =     25    _____
FrameID =     26    _____xx_____
FrameID =     27    _____
FrameID =     28    _____xx_____
FrameID =     29    _____
FrameID =     30    _____xx
*********************************************
```

Fig. 9.31

```
FrameMask =   31
===============
                              1         2         3
FrameNumber   01234567890123456789012345678901

FrameID =   0   x
FrameID =   1   _x
FrameID =   2    _x
FrameID =   3     _x
FrameID =   4      _x
FrameID =   5       _x
FrameID =   6        _x
FrameID =   7         _x
FrameID =   8          _x
FrameID =   9           _x
FrameID =  10            _x
FrameID =  11             _x
FrameID =  12              _x
FrameID =  13               _x
FrameID =  14                _x
FrameID =  15                 _x
FrameID =  16                  _x
FrameID =  17                   _x
FrameID =  18                    _x
FrameID =  19                     _x
FrameID =  20                      _x
FrameID =  21                       _x
FrameID =  22                        _x
FrameID =  23                         _x
FrameID =  24                          _x
FrameID =  25                           _x
FrameID =  26                            _x
FrameID =  27                             _x
FrameID =  28                              _x
FrameID =  29                               _x
FrameID =  30                                _x
FrameID =  31                                 _x

```
FrameMask =   1
===============
FrameID =   0   x x x x x x x x x x x x x x x x
FrameID =   1    x x x x x x x x x x x x x x x x
```
*******************************************

Fig. 10.2

```
FrameMask =   3
===============
FrameID =   0   x___x___x___x___x___x___x___x__
FrameID =   1   _x___x___x___x___x___x___x___x_
FrameID =   2   __x___x___x___x___x___x___x___x
FrameID =   3   ___x___x___x___x___x___x___x___x
```
*******************************************

Fig. 10.3

```
FrameMask =   7
===============
FrameID =   0   x_____x_____x_____x_____
FrameID =   1   _x_____x_____x_____x_____
FrameID =   2   __x_____x_____x_____x____
FrameID =   3   ___x_____x_____x_____x___
FrameID =   4   ____x_____x_____x_____x__
FrameID =   5   _____x_____x_____x_____x_
FrameID =   6   _____x_____x_____x_____x
FrameID =   7   _____x_____x_____x_____x
```
*******************************************

Fig. 10.4

```
FrameMask =   15
===============
FrameID =   0    x_____x_____
FrameID =   1    _x_____x_____
FrameID =   2    __x_____x_____
FrameID =   3    ___x_____x_____
FrameID =   4    ____x_____x_____
FrameID =   5    _____x_____x_____
FrameID =   6    _____x_____x_____
FrameID =   7    _____x_____x_____
FrameID =   8    _____x_____x_____
FrameID =   9    _____x_____x_____
FrameID =  10    _____x_____x____
FrameID =  11    _____x_____x___
FrameID =  12    _____x_____x__
FrameID =  13    _____x_____x_
FrameID =  14    _____x_____x
FrameID =  15    _____x_____x
```
*******************************************

Fig. 10.5

```
FrameMask =   31
================

FrameID =    0    x
FrameID =    1     x
FrameID =    2      x
FrameID =    3       x
FrameID =    4        x
FrameID =    5         x
FrameID =    6          x
FrameID =    7           x
FrameID =    8            x
FrameID =    9             x
FrameID =   10              x
FrameID =   11               x
FrameID =   12                x
FrameID =   13                 x
FrameID =   14                  x
FrameID =   15                   x
FrameID =   16                    x
FrameID =   17                     x
FrameID =   18                      x
FrameID =   19                       x
FrameID =   20                        x
FrameID =   21                         x
FrameID =   22                          x
FrameID =   23                           x
FrameID =   24                            x
FrameID =   25                             x
FrameID =   26                              x
FrameID =   27                               x
FrameID =   28                                x
FrameID =   29                                 x
FrameID =   30                                  x
FrameID =   31                                   x

*******************************************
```

METHOD AND SYSTEM FOR PROCESSING DATA

FIELD OF THE INVENTION

The present invention relates to a method and a system for real time data transmission between modules linked serially to one another, especially between measuring unit modules.

BACKGROUND INFORMATION

Field buses or process networks are used for real time data transmission between actuators and sensors, especially in the field of automation technology. The data have to be transmitted via the field bus in ensured fashion within an established time span, so that field buses make a high demand on the latency for data transmission. The Ethernet is also increasingly being used as a field bus, a broad use of data transmission protocols from the TCP/IP protocol family being striven for. The Ethernet standard specifies various data transmission speeds, such as Ethernet networks having data transmission speeds of 10 Mbit per second, 100 Mbit per second and 1 Gbit per second. Moreover, there are Ethernet networks in which the data are transmitted in a wireless manner via radio. What is common to these Ethernet networks is the decoupling of the physical data transmission and the protocol layer, which states how the respective data packets are structured. The physical data transmission is implemented by semiconductor IC's and an appropriate wiring of the units or modules connected to one another. The protocol layer is identical for all types of transmission. In the case of the Ethernet, the protocol layer, in turn, includes an abundance of various data transmission protocols, such as TCP/IP, FTP, HTTP. Usually, a microprocessor combines the data packets corresponding to the desired data protocol, and sends them to the physical data transmission unit. In the field of real time transmission, particularly in measured data recording in the industrial field, for controlling machines or systems, in which the predictability of the data transmission is important, the Ethernet has not yet been widely used as the transporting medium. Because of the use of switches and the TCP/IP or UDP protocol with regard to a real time capability, the Ethernet is little deterministic and has a greater jitter than usual field bus systems.

FIG. 1 shows a conventional Ethernet topology. In this instance, several measuring units MG are connected to a data processing unit, such as a PC, via an Ethernet switch. The Ethernet switch represents a multiplexer which analyzes the data on the Ethernet and routes them on appropriately. If several measuring units simultaneously send data in the direction towards the PC, collisions take place which the Ethernet switch is only partially able to balance out. It cannot be ensured, in this context, that measured data which are transmitted by measuring unit MG to the Ethernet switch arrive at the PC even in response to the first data transmission attempt. When a collision does occur, the data are sent again by measuring unit MG. In the course of that, there comes about an unknown delay time between the creation of the data in the measuring unit MG and the arrival of the data at the PC. This unknown delay time depends on how many measuring units MG are connected to the Ethernet switch and what data volume the individual measuring units MG have at the various points in time. Since renewed sending of the data by measuring unit MG is required under certain circumstances, the measured data further have to be temporarily stored. The star-shaped topology shown in FIG. 1 also has the disadvantage that the wiring expenditure is relatively large.

In the usual Ethernet data transmission systems for transmitting real time data, collisions are avoided by the PC requesting the real time data or the measured data from the individual measuring units MG in a so-called handshake method. For this purpose, an appropriate data memory and an appropriate data management are provided in the various measuring units MG. However, the disadvantage of a data transmission after a handshake method is that the bandwidth provided by the Ethernet is not able to be fully utilized, since either data are sent from the PC to a measuring unit MG or conversely data from a measuring unit MG to the PC. Consequently, the data are transmitted in a half duplex operation. The result is that the data transmission times or transport times in such usual Ethernet field bus systems are not minimal, and are strongly dependent on the number of interconnected measuring units MG. Real time requirements, such as particularly the predictability of the data transmission times and short latency times, are therefore not satisfied in such usual Ethernet systems.

SUMMARY

Example embodiments of the present invention provide a method and a system for real time transmission which has minimum latency times in the data transmission.

Example embodiments of the present invention provide a method for transmitting data between modules that are serially connected to one another, the useful data of a module being in each case embedded in a data packet (frame) received by a preconnected module, which has a unique data packet number (frame number), if a comparison value formed as a function of the data packet number (frame number) agrees with an identification number (frame ID) provided in the module.

One advantage of the method is that the wiring expenditure is minimized compared to the star topology shown in FIG. 1.

An additional advantage of the method is that the predictability of the data transmission, that is, the jitter of the latency times occurring in response to the data transmission is minimal.

Consequently, the method has a deterministic response having predictable latency times, the jitter being minimal and preferably being less than 10 microseconds.

In an example embodiment of the method according to the present invention, the comparison value is formed by a logical linkage of the data packet number (frame number) to a configurable masking value (frame mask).

This has the advantage that the periodicity of the data transmitted by a module is able to be set by a suitable selection of the masking value (frame mask) and the identification number (frame ID).

In an example embodiment of the method according to the present invention, the data packet number (frame number) is logically AND-linked with the masking value (frame mask).

According to an alternative example embodiment of the method according to the present invention, the comparison value is formed by the data packet number of the received data packet itself.

In still another example embodiment of the method according to the present invention, in each case at least one identification number is stored in the modules.

In still another example embodiment of the method according to the present invention, in each case at least one masking value (frame mask) is stored in the modules.

In an example embodiment of the method according to the present invention, the useful data of the module are embedded as useful data of a datagram, especially an XCP datagram, in the received data packet.

In another example embodiment of the method according to the present invention, the useful data are embedded by the module in each case in the received data packet, for the generation of an extended data packet, to the extent that useful data are available in the module.

In still another example embodiment of the method according to the present invention, the useful data are embedded by the module in each case in the received data packet, for generating the extended data packet, only if an identification flag or identification bit included in the received data packet has been set.

In an example embodiment of the method according to the present invention, the extended data packet is sent to a like module postconnected to the module.

In an example of the method according to the present invention, the useful data are formed by measured data.

In an example embodiment of the method according to the present invention, the modules serially connected to one another form a module chain which is connected to a data processing unit, such as a PC, which processes the data transmitted in the data packets.

In still another example embodiment of the method according to the present invention, the module of the module chain, that is farthest away from the data processing unit, has a data packet generator which periodically generates empty data packets that include no useful data.

The frequency $f_{FG}$ at which the data packet generator of the last module generates the empty data packets, in this context, is set in such a way that this frequency is greater than, or equal to a maximum measured data rate of all modules of the respective module chain.

In another example embodiment of the method according to the present invention, the data packets generated by the data packet generator in each case have management data (header data) having a unique data packet number of the data packet.

In this context, the data packet generator, preferably continuously, numbers the generated empty data packets.

In yet another example embodiment of the method according to the present invention, the modules of the module chain are synchronized with one another.

In yet another example embodiment of the method according to the present invention, the data packets are transmitted in full duplex mode via a transmission medium.

In an example embodiment of the method according to the present invention, the data processing unit transmits data packets, which include output data or actuating data, as useful data to the modules of the module chain.

In another example embodiment of the method according to the present invention, each module of the module chain recognizes the data packets respectively destined for the module, with the aid of the management data of the data packets received by the data processing unit through the module, and decouples the useful data contained in the data packet.

In an example embodiment of the method according to the present invention, the transmitted data packets are formed by Ethernet data packets.

In an example embodiment of the method according to the present invention, the transmission medium is formed by a 100 MB Ethernet cable.

Example embodiments of the present invention further provide a real time data transmission system for transmitting data between modules that are serially connected to one another, each module embedding its useful data in a data packet (frame) received by a preconnected module, which has a data packet number (frame number), if a comparison value formed as a function of the data packet number agrees with an identification number (frame ID) provided in the module.

Example embodiments of the present invention further provide a module for the real time data transmission, the module embedding its useful data in a data packet (frame) received by a preconnected module, which has a data packet number (frame number), if a comparison value formed as a function of the data packet number (frame number) agrees with an identification number (frame ID) provided in the module.

In an example embodiment of the module for real time data transmission according to the present invention, the module has a first transceiver for connecting to a preconnected module, and a second transceiver for connecting to a postconnected module, as well as an FPGA unit (field programmable gate array).

The FPGA unit of the module preferably has a logic unit, in this context, which logically links the data packet number (frame number) of a received data packet to a configured masking value (frame mask) to generate a comparison value.

In another example embodiment of the module for real time data transmission according to the present invention, the FPGA unit of the module has a first register for storing an associated configurable masking value (frame mask) and a second register for storing an associated configurable identification number (frame ID). In an example embodiment of the module for real time data transmission according to the present invention, the logic unit provided in the FPGA unit links the stored masking value (frame mask) to the data packet number (frame number) of the received data packet bit-wise, to generate a comparison value logical AND.

In yet another example embodiment of the module for real time data transmission according to the present invention, the FPGA unit has a comparison unit which compares the comparison value generated by the logic unit to the stored identification number (frame ID).

In an example embodiment of the module according to the present invention, the FPGA unit has a computing unit which is connected to a first transceiver via a first media access controller (MAC) and to a second transceiver via a second media access controller (MAC).

Example embodiments of the method according to the present invention and of the real time data transmission system according to the present invention, as well as of the module for real time data transmission according to the present invention, are described below, with reference to the attached figures, to explain the features of example embodiments of the present invention.

BRIEF DESCRIPTION OF THE DRAWINGS

FIG. 9 an example of a possible time slice allocation according to the method according to the present invention, for five-bit wide masking values; and FIG. 10 a selection of the masking values shown in FIG. 9 for clarifying the setting of a periodicity in the time slice allocation according to the method for real time data transmission according to the present invention.

DETAILED DESCRIPTION

Figure 1:
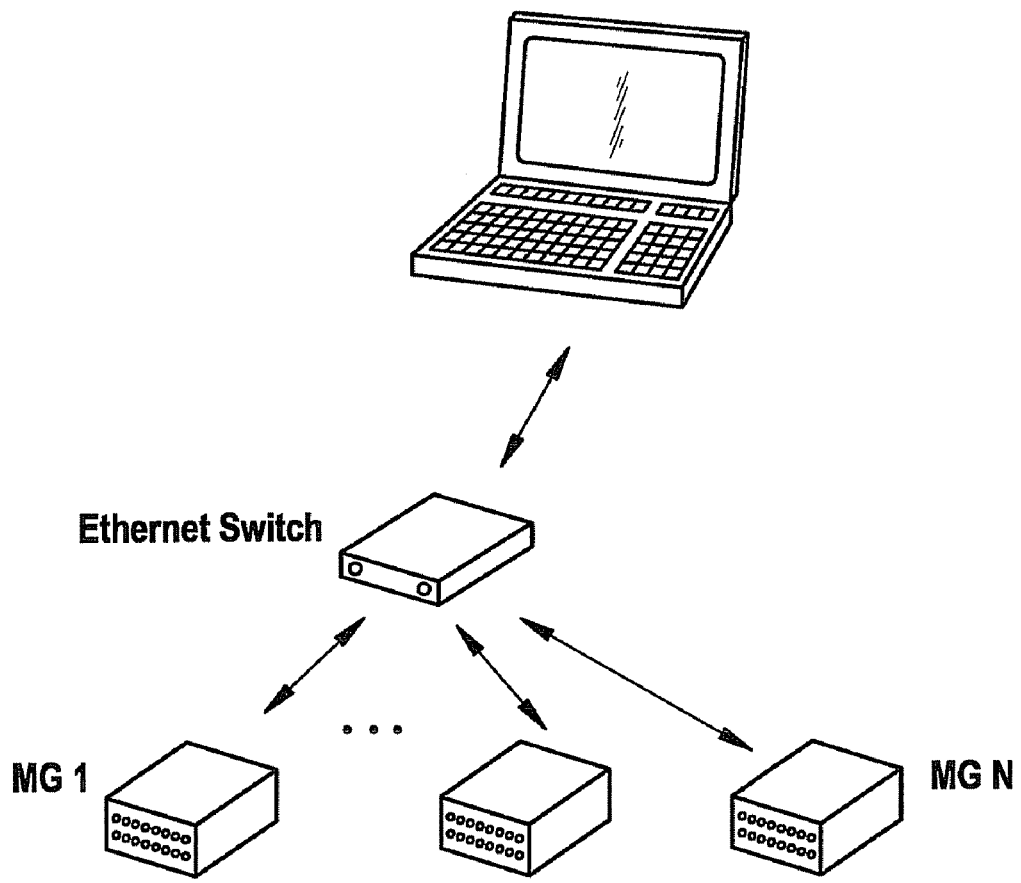
FIG. 1 a conventional Ethernet field bus system.
Figure 2:
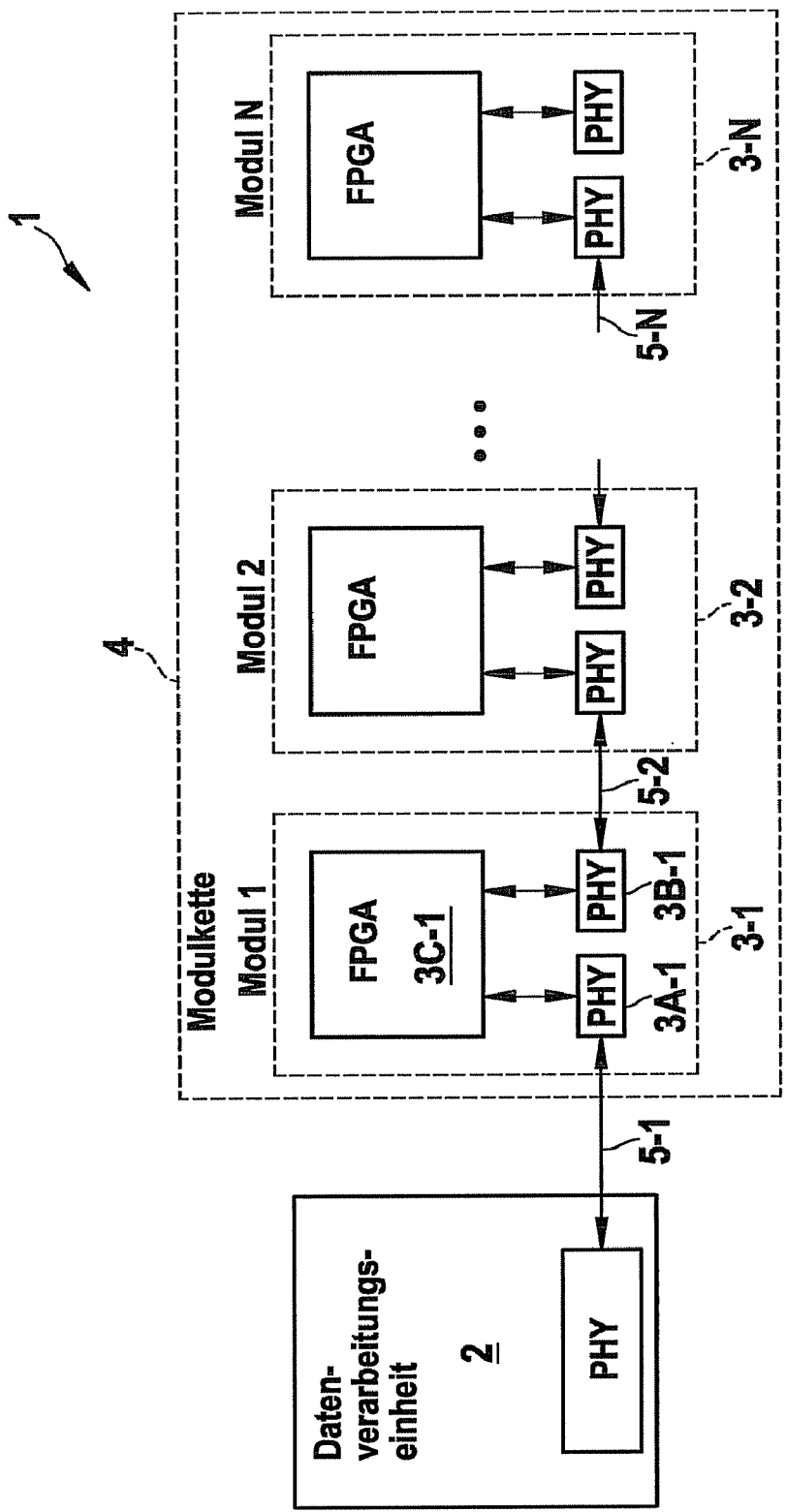
FIG. 2 a block diagram of an example embodiment of the real time data transmission system according to the present invention, having a plurality of modules linked serially to one another.

As may be seen in FIG. 2, a real time data transmission system 1 includes at least one data processing unit 2, to which a module chain 4 made up of modules 3 is able to be connected. Module chain 4 includes N modules 3 that are serially connected to one another. Modules 3 are any module or measuring units which supply real time measured data. Modules 3 are linked to one another via a cable 5, first module 3-1 of module chain 4 being connected via a cable 5-1 to data processing unit 2. The data transmission medium or cable 5-$i$ is any data transmission cable. In an alternative example embodiment, the data transmission between the modules takes place in a wireless manner. In the specific embodiment shown in FIG. 2, each module 3 includes two transceivers PHY for data transmission. Furthermore, each module includes one FPGA unit (FPGA: field programmable gate array).

Transceivers PHY are preferably transceivers for transmitting Ethernet data packets. One of the two Ethernet transceivers is connected to an adjacent module of module chain 4, in the direction towards data processing unit 2. An additional module for the extension of module chain 4 may be connected to the other Ethernet transceiver. Module chain 4 may be extended at will. Furthermore, module chain 4 may be incorporated in, or interconnected to any network topologies.

Data processing unit 2 is normally a PC. Data processing unit 2, or rather, the master unit has access to the unit composite made up of modules 3, which, as seen from master unit 2, is represented as an Ethernet unit having an MAC address. The data packets are transmitted between modules 3 and between module chain 4 and data processing unit 2 in a full duplex mode, that is, in two communication directions that are dependent on each other. The last module 3-N of module chain 4 cyclically generates empty data packets. For this purpose, the FPGA unit of last module 3-N includes a data packet generator, which periodically generates empty data packets which contain no useful data. The data packets include only management data (header data) having in each case a unique data packet number of the data packet. In an example embodiment, the time slices or the data packets are numbered through continuously on the data packet, so that, in the case of a 16 bit-wide data packet number, data packet numbers between 0 to 65.535 are yielded. The frequency with which the data packet generator generates data packet numbers is preferably adjustable. In this context, the frequency $f_{FG}$ at which the empty data packets will be generated by the data packet generator of last module 3-N, is set in such a way that it is equal to, or higher than the highest occurring measured data rate in modules 3 of module chain 4. An empty Ethernet data packet without useful data is generated per time slice by the data packet generator.

The generated data packet is transmitted by last module 3-N of module chain 4 in the direction towards data processing unit 2, via the next module 3-(N−1) of the same kind. The transmitted data packet has a unique data packet number (frame number). As a function of the data packet number, the next module forms a comparison value, and checks whether the comparison value formed agrees with an identification number (frame ID) that is also provided in module 3-(N−1). If this is the case, the real time data available in the respective module are embedded in the received data packet to generate an extended data packet, while the latter is transmitted to the subsequent module. Module chain 4 transmits autonomously the extended data packets thus formed outwards, which are received, for instance, by a PC 2, without module chain 4 having to receive control commands from the PC 2. From the point of view of module chain 4, the data reception signal path is completely independent of the data transmission signal path, and is thus available with its complete bandwidth, for instance, for transmitting actuating control signals to appropriate modules 3 of module chain 4. Since modules 3 send the real time data that are to be transmitted on their own, without request to data processing unit 2, in modules 3-$i$ in each case no data memory is necessary, and also no memory management. The logic present in each of modules 3 is preferably implemented by an FPGA unit (field programmable gate array). Minimal latencies for the data transport are achieved thereby. Each module 3 of module chain 4 is made up at least of one first and second transceiver 3A, 3B as well as an FPGA unit 3C.

Figure 3:
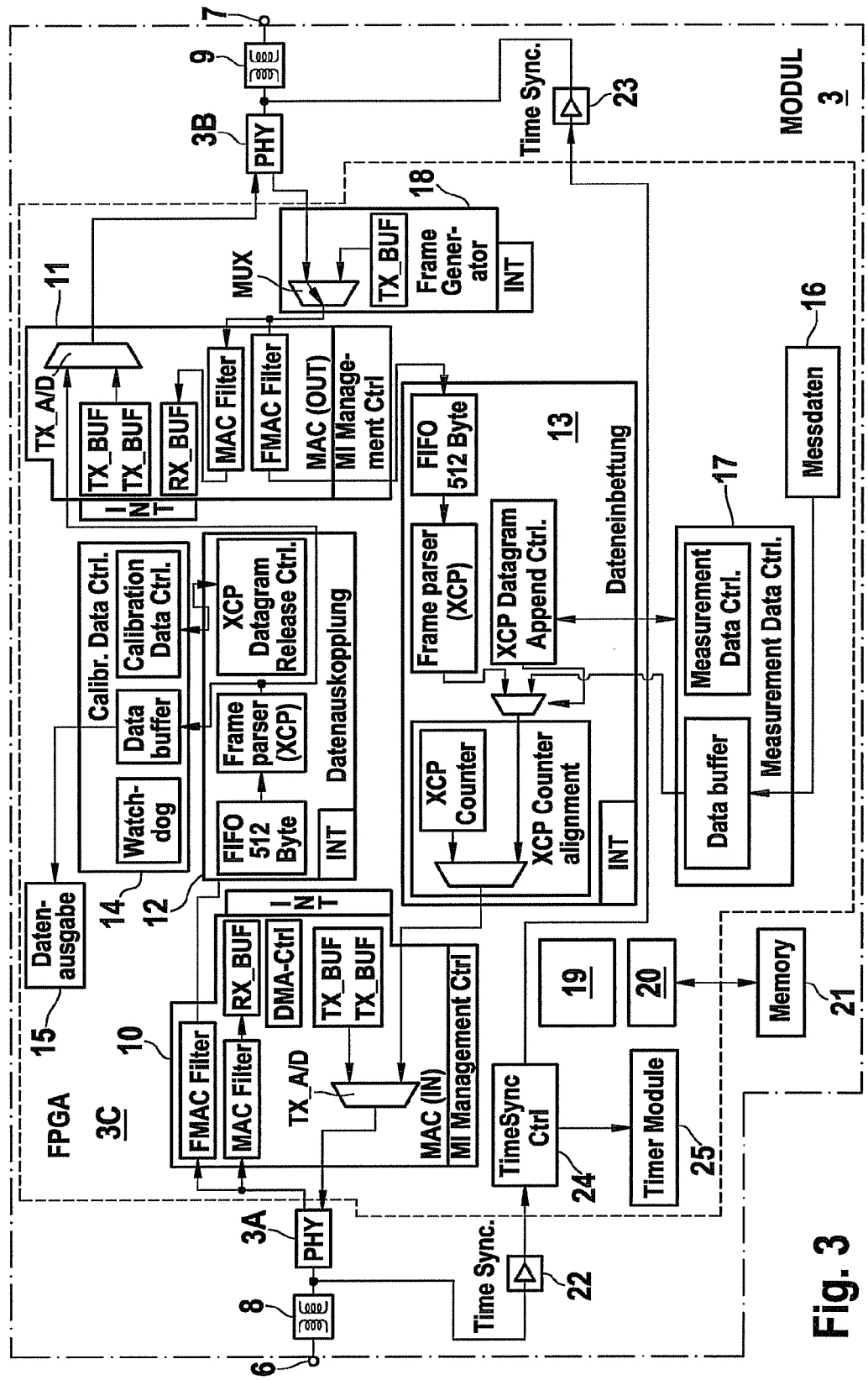
FIG. 3 a block diagram of a possible implementation of a module for real time data processing according to the present invention.

FIG. 3 shows a preferred implementation of an FPGA unit 3C within a module 3 according to the present invention. Module 3-$i$ has a terminal 6 for connection to a postconnected module 3$i$−1, and a second terminal 7 for connection to a preconnected module 3$i$+1.

The two terminals 6 and 7 are connected to the two Ethernet transceivers 3A, 3B provided in module 3, via transformers 8, 9. Transceiver 3A is connected via terminal 6 in the direction towards data processing unit 2, while transceiver 3B is connected via terminal 7 to additional preconnected modules 3 of module chain 4. In FPGA unit 3C of module 3 two media access controllers (MAC) 10, 11 are provided. Media access controllers 10, 11 control the access to the transmission medium. For this purpose, the two media access controllers 10, 11 are each connected respectively to the two Ethernet transceivers 3A, 3B. A data decoupling unit 12, for decoupling useful data, and a data embedding unit 13, for inserting useful data are provided between the two media controllers 10, 11. The data packets coming from media access controller 10 are passed through, by data decoupling unit 12, unchanged to media access controller 11. In data decoupling unit 12 there is a FIFO data memory that may be used for temporarily storing the data packets arriving from media access controller 10. A frame parser (XCP) in data decoupling unit 12 analyzes the data packets received and takes from it useful data destined for module 3. For example, the XCP frame parser decouples XCP datagrams that are embedded in the Ethernet packets received, and stores them in an output temporary memory 14. The criteria or parameters that state which XCP datagrams are assigned to which module 3 are communicated to data decoupling unit 12 by a microprocessor 19 of FPGA unit 3C, via an internal interface INT. Microprocessor 19 may be a NIOSII processor of the firm of Altera, for example. This NIOSII processor 19 assumes all the essential configuration tasks, in this context. The useful data decoupled by data decoupling unit 12 are temporarily stored in output temporary storage 14, and are subsequently output via a data output interface of module 3.

A data embedding unit 13 is also provided between media access controller 10 and media access controller 11. Data packets that are supplied by media access controller 11 to data embedding unit 13 are analyzed by a frame parser (XCP) within data embedding unit 13. as long as useful data or measured data are present and additional criteria are satisfied, the useful data are embedded by data embedding unit 13 in the data packets received, or appended to them. Module 3$i$ embeds its useful data in a data packet or data frame received by preconnected module 3$i$+1 if a comparison value formed as a function of the data packet number (frame number) agrees with an identification number (frame ID) provided in module 3$i$. The useful data input via a data interface 16 are temporarily stored in a useful data memory 17 and, upon agreement of the comparison value with the data packet number, are appended to the respective data packet or embedded in it.

FPGA unit 3C also includes a data packet generator 18, which is able to be connected to media access controller 11 as an alternative to transceiver 3B via a multiplexer contained in it. Only in last module 3-N of module chain 4 is data packet generator 18 switched in, that is, the multiplexer shown in FIG. 3 within data packet generator 18 is switched over. Media access controller 11 of last module 3-N of module chain 4 therefore no longer receives data packets from the outside via terminal 7, but receives data packets that are generated by data packet generator 18 of last module 3-N. Data packet generator 18 generates empty data packets which contain no useful data. The data packets each include only management data or header data and are generated at an adjustable frequency by data packet generator 18 of last module 3-N. The management data included in the empty data packets include a unique data packet number which is preferably numbered through continuously. Data packet generator 18 is preferably configured by NIOS-II processor 19. In the process, data packet generator 18 preferably generates cyclically complete UDP-IP-Ethernet frames which include no useful data.

Besides NIOS-II microprocessor 19, module 3 includes a memory control 20 for connecting a data memory 21. In one preferred specific embodiment, for synchronization, synchronization units 22 and 23, as well as a synchronization control 24 are connectable to a timer module 25. Microprocessor 19 is connected via internal interfaces INT to the two media access controllers 10, 11 of data decoupling unit 12 as well as data embedding unit 13.

Figure 4:
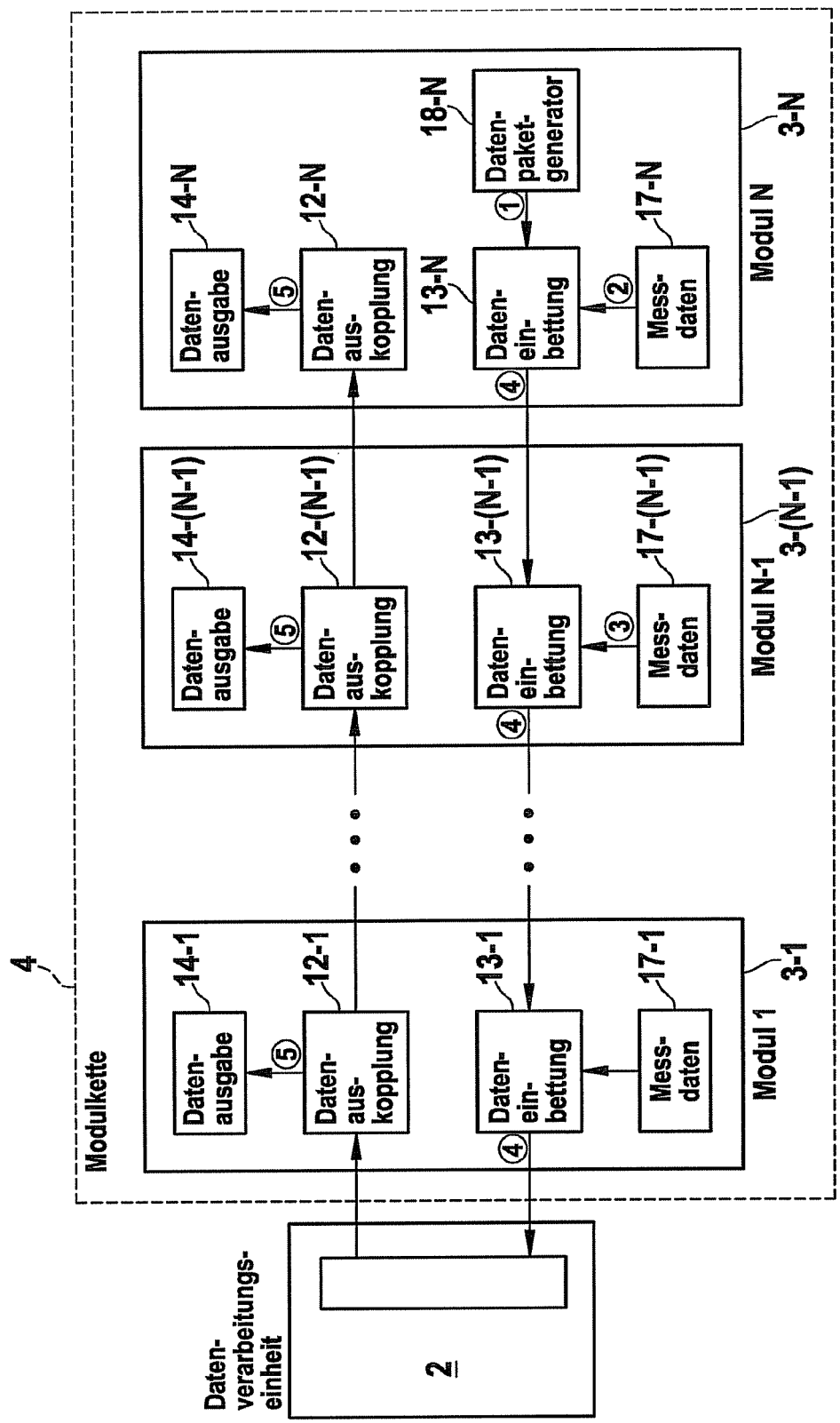
FIG. 4 a block diagram for explaining the functioning of the real time data processing system according to the present invention.

FIG. 4 shows schematically the essential components of the real time data transmission system according to the present invention. Each of modules 3 has respectively a data decoupling unit 12 and a data embedding unit 13. Data packet generator 18-N is activated only in last module 3-N of module chain 4. Data packet generator 18-N generates empty data packets without useful data cyclically, at a specified frequency.

Figure 5A:
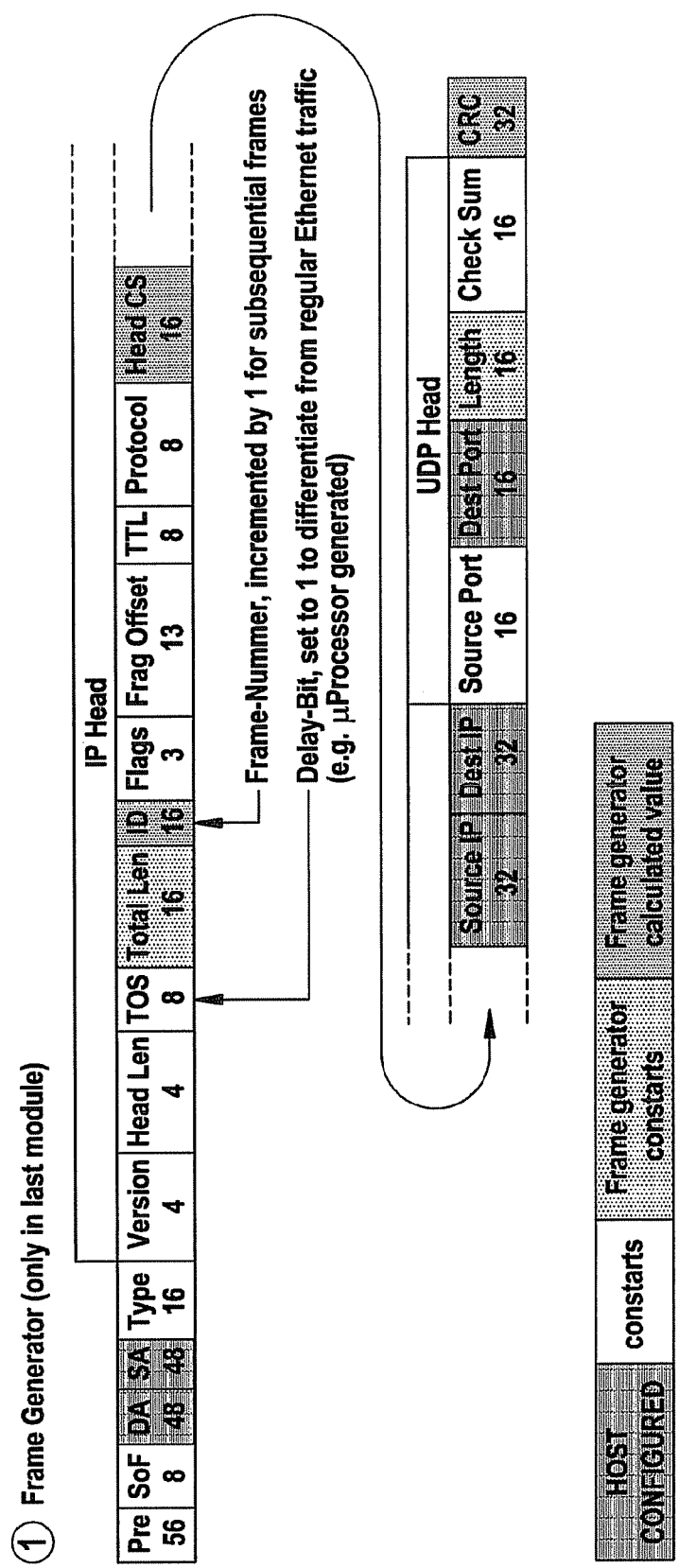
FIG. 5 data diagrams for explaining the Ethernet data packets for transmitting measured data to a data processing unit used in an example embodiment of the method according to the present invention.
Figure 5B:
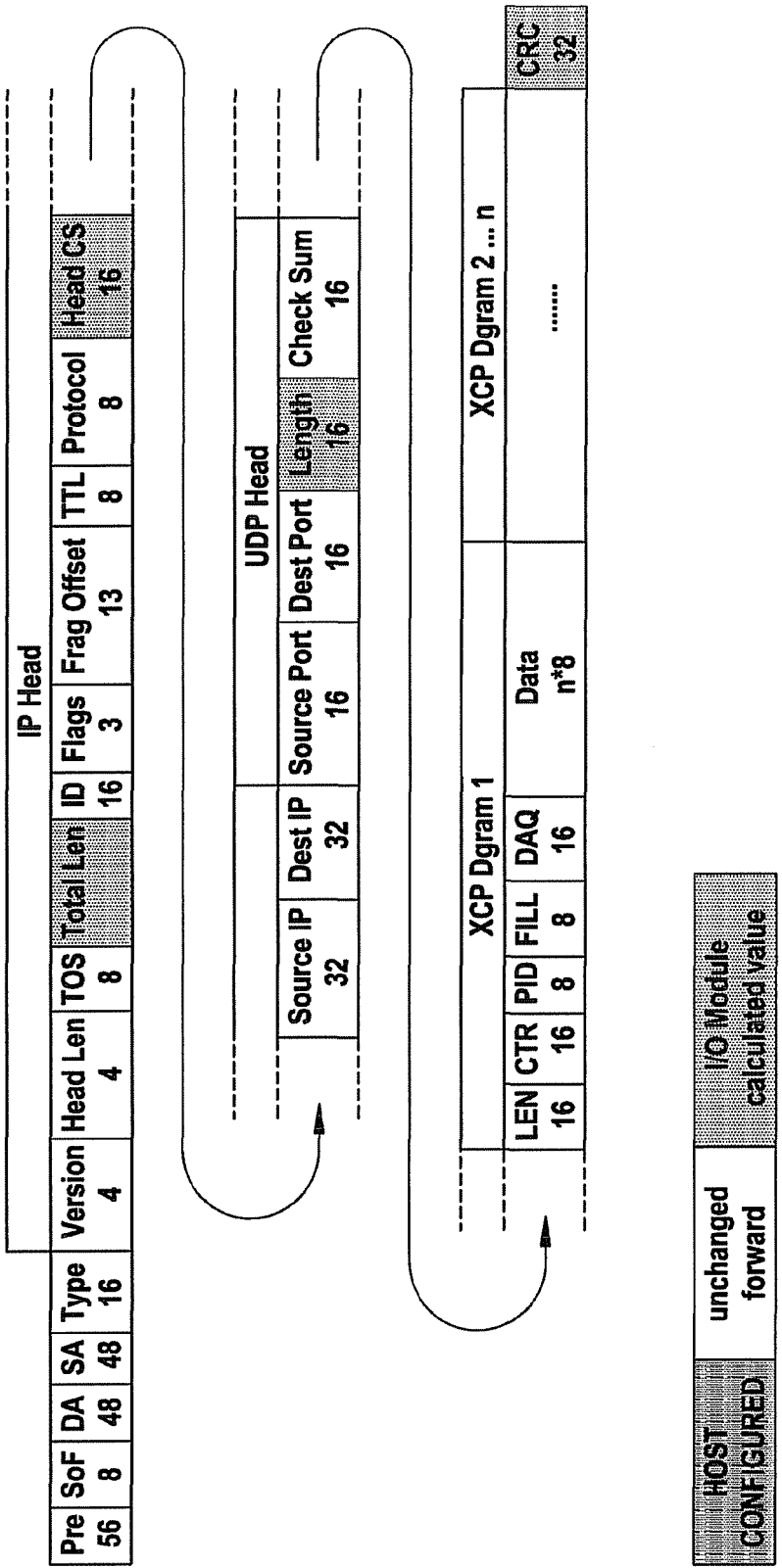

FIG. 5 shows the structure of UPD/IP Ethernet data packets in an example embodiment of the method according to the present invention at various locations in module chain 4, as they are shown in FIG. 4. The numbers given in the respective little boxes state the bit width of the respective data bit field.

As shown in FIG. 5A, data packet generator 18-N generates the UDP/IP data packet shown there without useful data content. Such a data packet or data frame is made up of Ethernet information (Pre, SOF, DA, SA, Type and CRC), an IP header or IP management data and a UDP header or UDP management data. The structure of the Ethernet data packet is given, for instance, in the Standard IEEE802.3 or RFC 791 for IP and RFC 768 for UDP at www.rfc.net. The IP management data include a data packet number (frame 1D) which includes 16 bits. The data packet number is incremented by one, for instance, at each newly generated data packet by data packet generator 18-N.

The data packet numbers are thereby continuously numbered, the number of different data packets being so large that the data packet number is issued uniquely in each case. The frequency at which data packet generator 18-N generates the empty data packets is preferably able to be set by processor 19 of the module, and amounts to 10 kilohertz, for example. The frequency $f_{FG}$ at which data packet generator 18-N generates the empty data packets at least as great as the highest measured data rate within module chain 4. The set frequency $f_{FG}$ gives the distance in time between two data packets or frames. The quantity of useful data which is able to be appended by modules 3 within module chain 4 to a data packet or embedded in it is a function of the selection, or rather, this frequency $f_{FG}$. The distance in time between two data packets, or their periodicity, is calculated from:

$$T_{FRAME} = \frac{1}{f_{FG}}$$

During this time, at 100 Mbit Ethernet having a bit duration of 10 nanoseconds per bit, the following number of bits is at a maximum able to be transmitted, inclusive of the IP/UDP header:

$$\text{Bits Per } Frame_{max} = \frac{T_{FRAME}}{10 \text{ ns/bit}}$$

An empty data packet, as generated by data packet generator 18-N, is made up of 528 bits, inclusive of gap IFG (interframe gap) that is to be provided between two data packets. In order to transmit individual data packets that are not time-controlled, time is reserved between two data packets, or frames, for the transmission of 1000 bits, for instance. This yields a maximum number of useful data bits that are able to be appended to a frame or a data packet:

Useful bits$_{max}$=bits per frame$_{max}$−528−1000

This means that, if one adds together the number of bits of all appended or embedded useful data or XPC datagrams, which are appended by modules 3 of module chain 4 to the generated data packet, this sum may not exceed the above given value useful bits$_{max}$. This is ensured in the data transmission system according to the present invention by a suitable selection of masking values and identification numbers in modules 3. In an example embodiment of the method according to the present invention, the useful data are embedded by a module 3 in each case in a received data packet, for generating an extended data packet, only if an identification flag has been set in the received data packet. This identification flag is preferably formed by a bit in the TOS field of the IP header. This bit may be, for instance, the so-called delay bit in the TOS field of the IP header. With the aid of the identification flag or the set delay bit, data embedding units 13 of the postconnected module 3 distinguish whether the received data packets are data packets for accommodating measured data or other Ethernet data packets, such as Ethernet data packets that are generated by a microprocessor 19. With each generated data packet, data packet generator 18-N increases a value in ID fields 1, and automatically calculates check sum data fields head CS and CRC. On their way to data processing unit 2, the data packets thus generated run through all data embedding units 13-$i$ of modules 3 provided in module chain 4.

FIG. 5 makes clear the embedding and the appending of useful data in a received data packet. Each data embedding unit 13 includes a first register for storing a configurable masking value (frame mask) and a second register for storing a configurable identification number (frame ID). Preferably, both values have a bit width of 16 bits.

In an example embodiment of the method according to the present invention, measured data for a received data packet are embedded or appended by a module 3 if the following three conditions are satisfied:

It is first checked by data embedding unit 13 whether useful data or network data are available or present at module 3.

Data embedding unit 13 then checks whether the identification flag has been set within the received data packet. To do this, for instance, the data embedding unit checks whether the delay bit is set in the TOS field of the IP header of the received data packet.

Subsequently, the data embedding unit carries out a logical linking of the data packet number (frame number), received in the received data packet, with the stored masking value, in order to generate a comparison value. The data packet number (frame number) is preferably linked with a logical AND to the masking value (frame mask), to form a comparison value, (frame Mask)AND(frame Number)=frame ID'

The comparison value frame ID' thus formed is then compared to identification number (frame ID) stored in the module, and it is checked whether the two values agree. If the logically generated comparison value (frame ID') and the identification number (frame ID) stored in the module agree, the available useful data of module 3 are appended to the data packet to be received or embedded in it to produce an extended data packet.

As shown in FIG. 5$b$, the useful data are preferably embedded as a complete XCP data packet in the Ethernet data packet. The XCP datagram is made up of fields LEN, CTR; PID, FILL, DAQ and the useful data. Data embedding unit 13 further calculates, in real time, the values for the fields total LEN, Head Cs in the IP header as well as length in UDP header and in Ethernet CRC. In the configuration of identification number (frame ID) and masking value (frame mask) in data embedding unit 13, for each module 3 space may be reserved for measured data and useful data in the Ethernet data packets. From the selection of the masking values and the identification number (frame ID), various possibilities come about for reserving the available bandwidth in the data packets.

The appending and embedding of data takes place successively in each module 3 of module chain 4.

Figure 6:
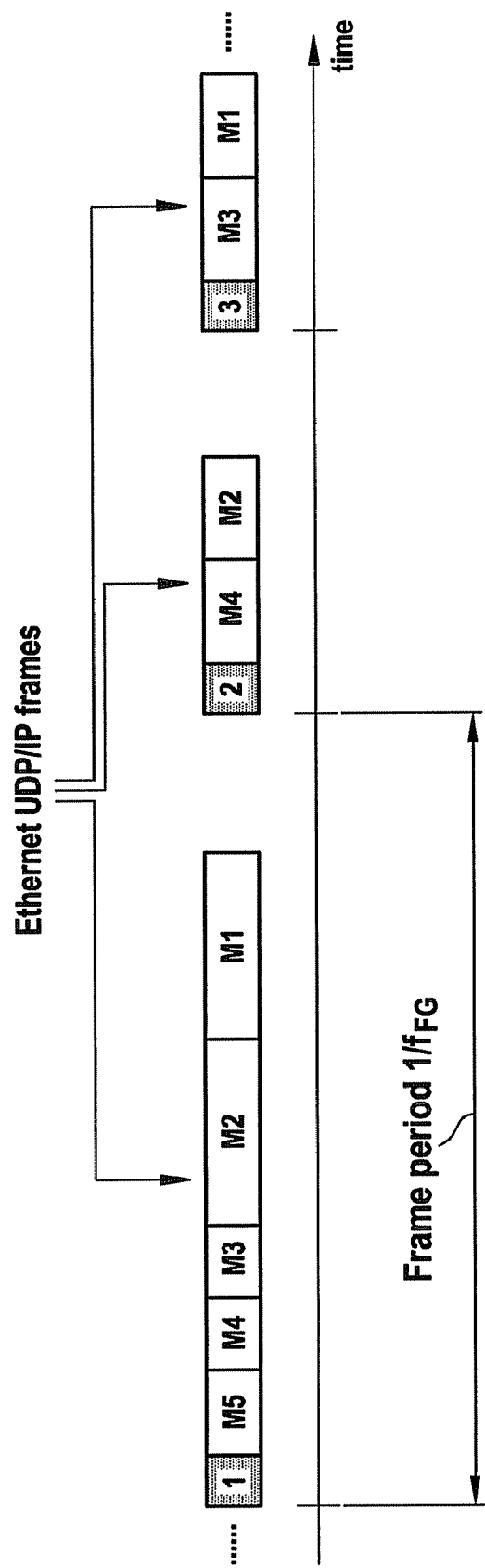
FIG. 6 a data diagram for explaining the time slot method for real time data transmission according to the present invention.

FIG. 6 schematically shows a reservation of time slots in the method according to the present invention for real time data transmission. Data packet generator 18-N of last module 3-N of module chain 4 cyclically or periodically generates empty UDP/IP Ethernet data packets, the period being set in such a way that all modules 3 of module chain 4 are in a position of embedding measured data or useful data in a sufficient volume in a received Ethernet data packet. By the selection of the masking values and the identification number (frame ID), a different bandwidth may be reserved for the different modules 3. The bandwidth is reserved, for example, as a function of the importance or the priority of the useful data made available. In the example shown in FIG. 6, the volume of the useful data appended by modules M1 and M2 is greater than the volume of the useful data of modules M3, M4 and M5. Since each Ethernet data packet has a unique data packet number, the logical linking with the configured masking value (frame mask) changes in response to each received data packet. By the suitable selection of the masking values (frame mask) and identification number (frame ID), a variable time slot scheme may be implemented. The time basis for clock pulsing of the measured data recording is preferably generated in the measuring units or modules 3-$i$. The method according to the present invention does not assume that modules 3-$i$ are synchronized with one another in time, that is, that the local time basis runs exactly the same for all modules 3. However, a synchronization of the respective local time bases is preferably provided so that measured data from different modules 3 are able to associated with one another in time. A synchronization ensures that the local time bases of modules 3 do not run apart from one another over the operating time. The maximum absolute difference of the local time bases preferably amounts to less than one microsecond.

Figure 7:
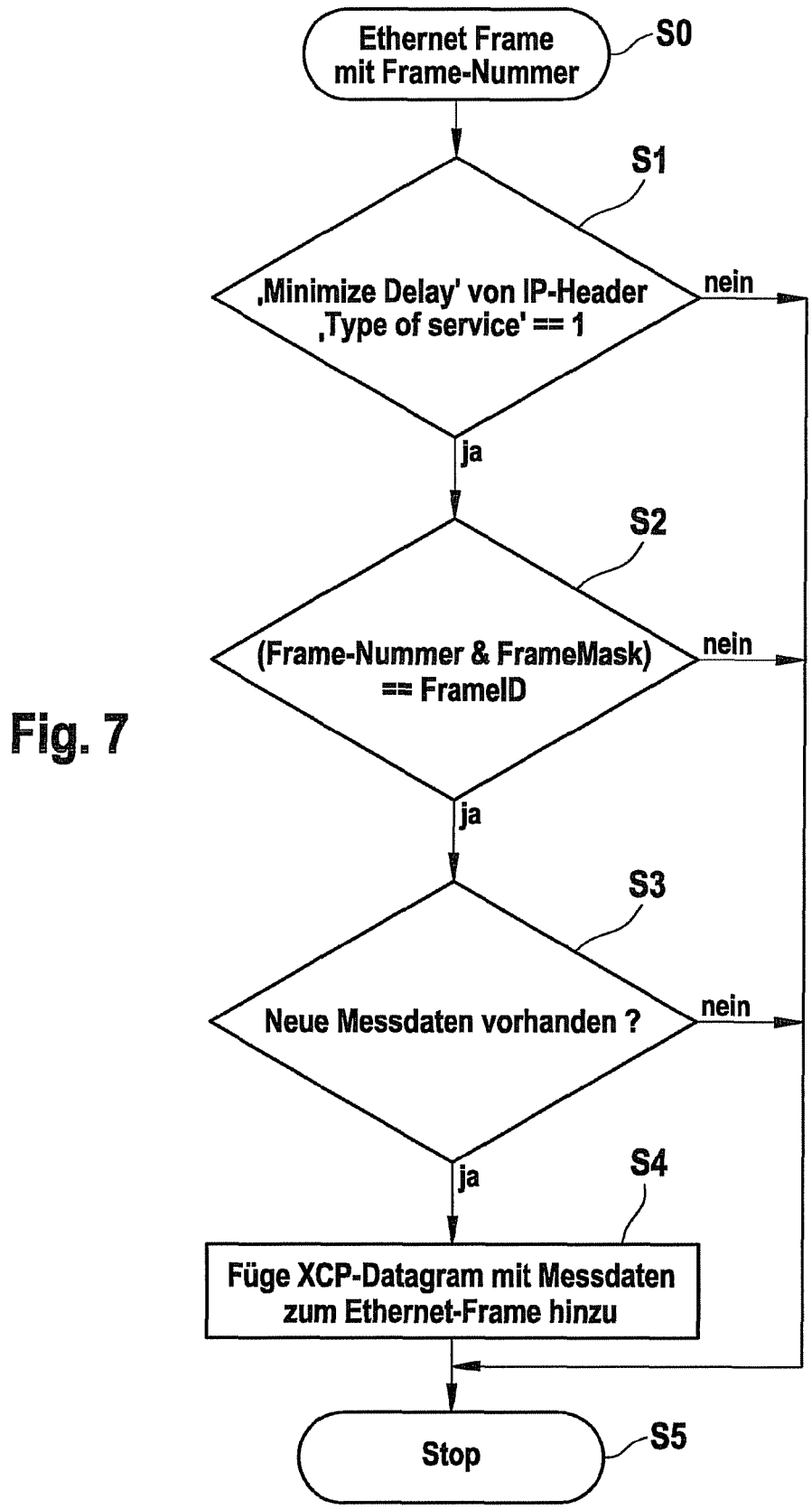
FIG. 7 a flow chart of an example embodiment of the method according to the present invention for data transmission between modules that are serially connected to one another.

FIG. 7 shows a simple flow chart to explain the functioning of the method according to the present invention, for the transmission of data between modules 3 that are serially connected to one another. FIG. 7 shows the embedding or appending of useful data by a module 3-$i$ of module chain 4. If a module 3-$i$ receives a data packet in step S-0, in step S1 it is first checked by data embedding unit 13 whether an identification flag has been set, that is provided in the management data of the data packet, that indicates that data may be embedded in the data packet. If this is so, data embedding unit 13 subsequently checks in step S2 whether a logical comparison value, formed as a function of the data packet number, agrees with an identification number (frame ID) configured in the module. For this, the data packet number is preferably linked logically AND with a configured masking value to form a comparison value, and is subsequently compared to the identification number. If the comparison value is identical to the identification number, data embedding unit 13 subsequently checks in step 3 whether measured data are present or available in module 3. If this is also the case, in a step S4, measured data or useful data are preferably embedded in or appended to the received Ethernet data packet as an XCP datagram. The process end in step S5.

As one may see in FIG. 7, the measured data or useful data are only added to the received data packets if three conditions are satisfied, which are tested in steps S1, S2, S3. The sequence of the checking of the various conditions is arbitrary, and thus one may check first whether measured data are present, and only then check the other two conditions.

Data embedding unit 13 embeds useful data in data packets which are transmitted starting from last module 3-N of module chain 4 to data processing unit 2. In the opposite direction, data decoupling unit 12 decouples data which are transmitted by data processing unit 2 in the direction towards last module 3-N of module chain 4. With the aid of the management data or header data of the data packet transmitted by data processing unit 2 to module 3, the data packets destined for the respective module 3 are recognized and the useful data included in them are decoupled by data decoupling unit 12.

Figure 8A:
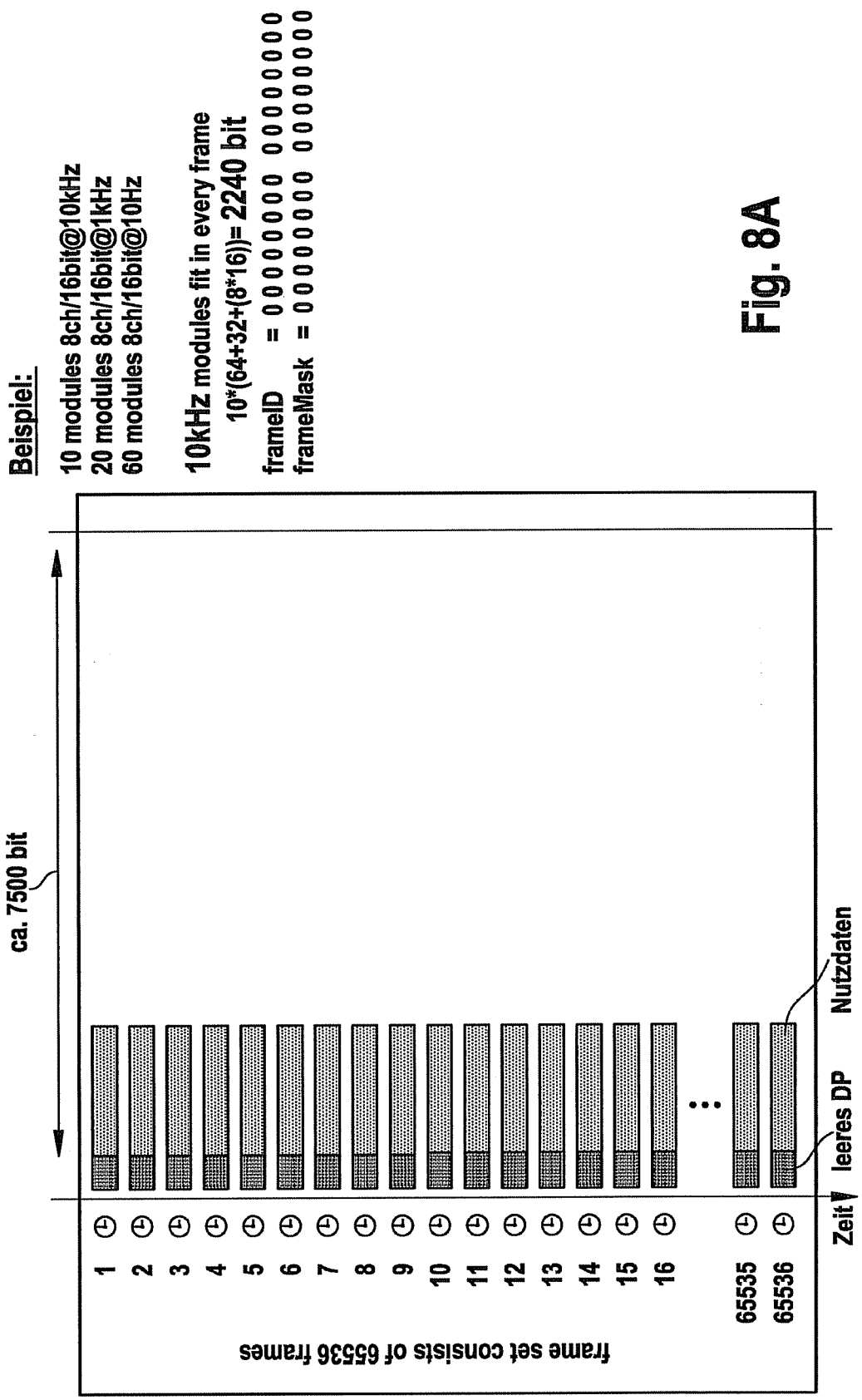
FIGS. 8a, 8b, 8c examples for clarifying an allocation of time slots in the method for real time data transmission according to the present invention.
Figure 8B:
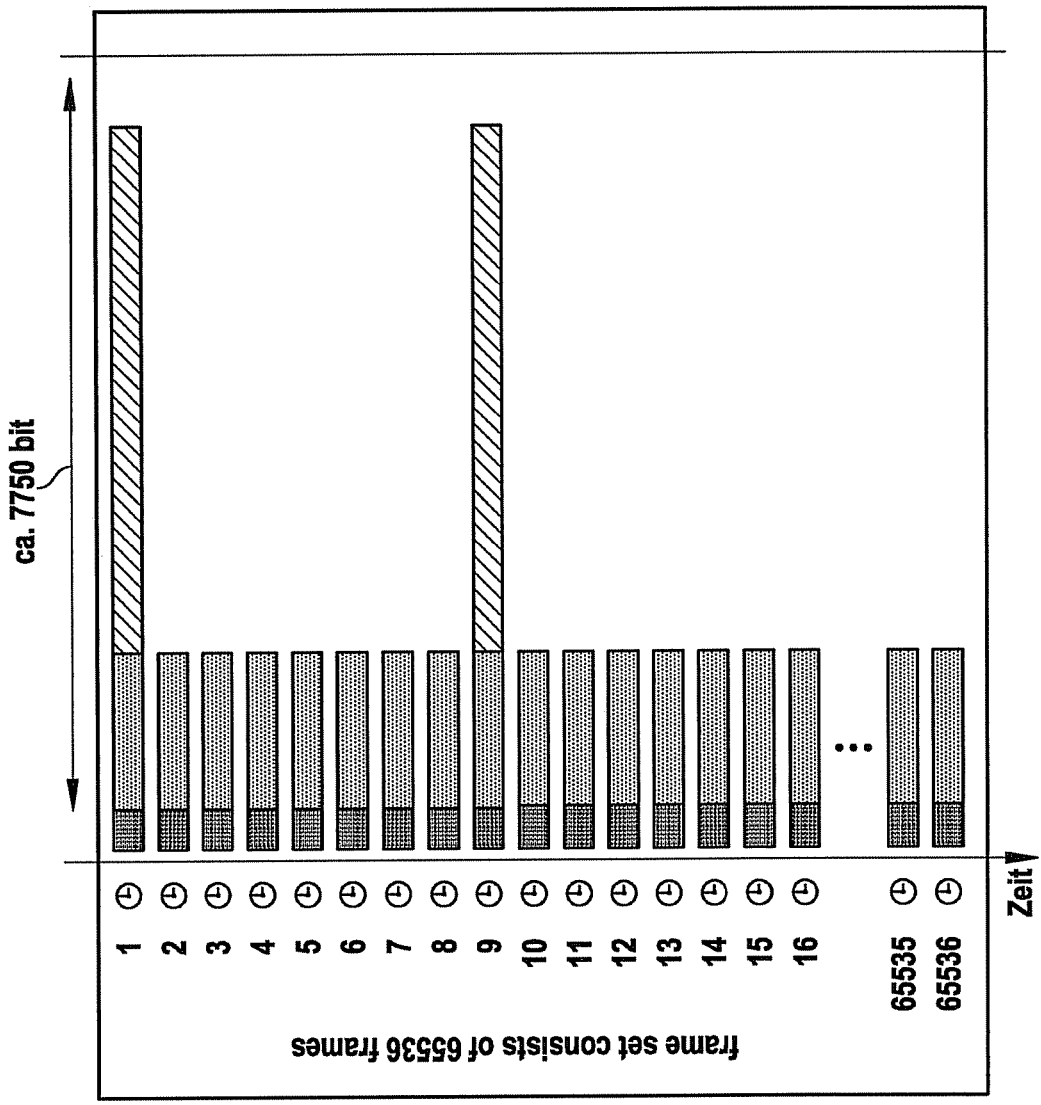
Figure 8C:
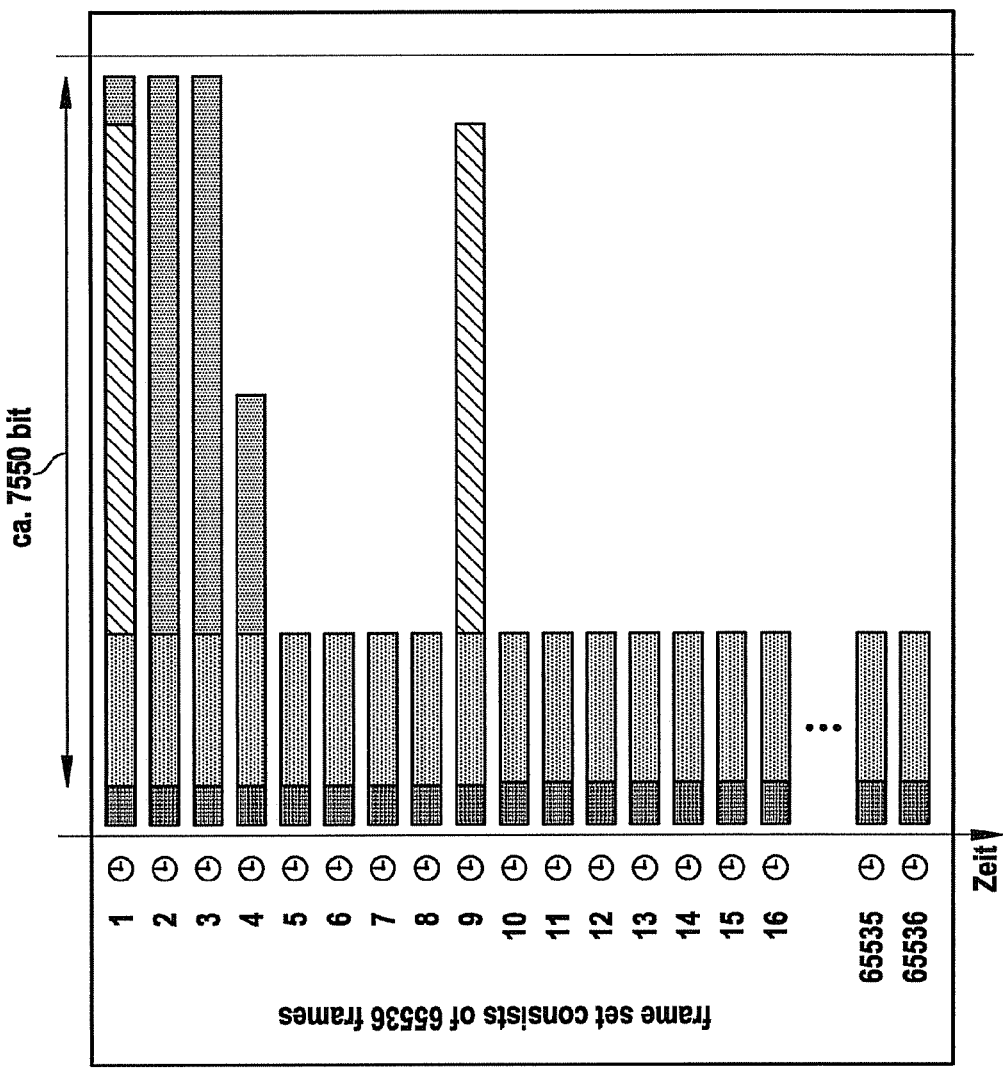

FIGS. 8$a$, 8$b$, 8$c$ show various examples to explain the functioning of the method according to the present invention for real time data transmission. In FIGS. 8a, 8b, 8c the time axis is plotted from top to bottom. The numbering to the left of the axis indicates the data packet number of the data packets, which is generated by data packet generator 18-N of the last module 3-N. The frame frequency or data packet frequency in the given example amounts to 10 kilohertz. At a data transmission of over 100 megabits Ethernet, this means that each successive Ethernet data packet is able to contain 10,000 bits, including the inter-frame gap. In the diagrams of FIGS. 8a, 8b, 8c, going from left to right, the time duration, or rather, the length of an Ethernet data packet is plotted in bits. Each Ethernet data packet includes an empty data packet not having useful data generated by the data packet generator. This empty data packet includes about 500 bits. This proportion is present in every Ethernet data packet. In addition, about 2,000 bits are provided as interframe gap or gap between two successive measured data frames. These temporal gaps of about 2,000 bits are provided for fitting other Ethernet data packets into the data flow which are sent by the a microprocessor of module 3 to data processing unit 2. The multiplexing of the measured data-data packets and of the other Ethernet data packets generated by the microprocessor takes place automatically in the media access controllers of modules 3. Each Ethernet data packet is thus still able to be character-filled in the given examples with approximately 7,500 bits of useful data.

In the example shown in FIGS. 8a to 8c, 90 modules 3-i are provided which each have eight measuring channels.

Ten first modules 3 have a data recording rate of 10 kilohertz. The length of an appended XCP datagram is calculated as:

$$64 \text{ bit } [XCP \text{ overhead}]+32 \text{ bit } [\text{time stamp}]+(8*16 \text{ bit})[\text{measured data}]=224 \text{ bit}$$

Twenty additional modules 3 have a recording rate of 1 kilohertz, in the example given. The XCP datagram length also amounts to 224 bits per module. The remaining modules 3 have a recording rate of 10 Hertz. The XCP datagram length also amounts to 224 bits per module.

In the given example, the bandwidth for the first ten modules 3 is reserved which each have a data recording rate of 10 kilohertz. The measured data frequency of these modules 3 corresponds to the frequency at which data packet generator 18-N generates the empty data packets. That is why in each Ethernet data packet that is generated by data packet generator 18-N, space for useful data of these modules has to be reserved. Data embedding units 13 of all these first ten modules 3 are therefore configured using the following values:

$$\text{masking value(frame mask)=identification number} \\ \text{(frame ID)}=00000000\ 00000000 \text{(binary)}$$

The logical linkage:

$$\text{(frame mask)AND(frame number)=frame ID}$$

is therefore fulfilled in these modules for each data packet number. The data packets shown in FIG. 8a are composed of the 500 bits of an empty data packet and of useful data which are distributed uniformly over all the data packets.

FIG. 8b shows the situation in which space for useful data is reserved for the additional 20 modules 3, which each have a data recording rate of 1 kilohertz. For this, space in every eighth data packet is reserved for the accommodation of useful data, in the example given. The logical linkage:

$$(00000000\ 00000111)\text{AND}(\text{Frame-Number})= \\ (00000000\ 00000001)$$

is satisfied for each data packet having data packet number 1, 9, 17, etc.

The hatched bars in FIG. 8b reflect the bandwidth reserved for the 20 additional modules 3.

FIG. 8c shows the situation after space for the further 60 modules 3 has subsequently been reserved which work at a data recording frequency of 10 Hz.

In data frame having number 1, there is only space for three more modules. These three further modules 3 receive the following configuration values:

$$\text{Frame ID}=00000000\ 00000001$$

$$\text{FrameMask}=00000001\ 11111111$$

$$\text{FrameMask AND frame Number=frameID}$$

is then satisfied for data packets having data packet numbers 1, 513, 1025, etc.

Of the remaining 57 modules 3, which work at a 10 Hz data recording frequency, space or bandwidth is reserved in the data packets having data packet numbers 2, 514, 1026, etc.

For this purpose, these modules 3 are provided with the following configuration values:

$$\text{FrameID}=00000000\ 00000010, \text{ frame-} \\ \text{Mask}=00000001\ 11111111$$

The useful data of 23 of the 57 modules fit into the second data packet, that is, having data packet numbers 2, 514, 1026. The next 23 of the 57 modules 3 fit into the third data packet, and are fitted into the data packets having data packet numbers 3, 515, 1027. These modules 3 receive the following configuration values:

$$\text{FrameID}=00000000\ 00000011,$$

$$\text{FrameMask}=00000001\ 11111111$$

Finally, of the 60 modules, 11 modules are still left over (57−23−23=11). For these modules 3, space is reserved in the data packets having data packet numbers 4, 516, 1028, etc.

The diagrams in FIGS. 8a, 8b, 8c show bars which only indicate the reservation of the corresponding bandwidth. The position of individual XCP datagrams of modules 3 within the data packets may be arbitrary, and depends on the position of the corresponding module 3 within module chain 4.

The assignment of the bandwidth for the various modules 3 takes place using a respectively configured masking value (frameMask) and using an identification number (frameID).

The periodicity with regard to the data packet number for reserving space and bandwidth is set by a suitable selection of these two values. In an example embodiment of the method according to the present invention, the value range for the configurable masking value (frameMask) is restricted in such a way that the value has a right-aligned group of one's within a binary value including 16 bits (0000000000000001, 0000000000000011, 0000000000000111, etc.). This corresponds to masking values 1, 3, 7, 15, 31, as shown in FIG. 10. To make it simple, a scheme having 5-bit wide values is given there. As may be seen in FIG. 10, the periosicity may be established by the selection of the masking value (frameMask). For instance, for frameMask=1, space for useful data is reserved in every second data packet. For frameMask=2, space for useful data is reserved in every fourth data packet. For frameMask=7, space for useful data is reserved in every eighth data packet, etc. Thus, because of the time slots, data packet separation distances of $2^n$ are able to be implemented, n being the bit width of the right-aligned group of one's of a masking value (frameMask) in binary representation. As may be seen in FIG. 10, the value of the identification number (frame ID) shifts the time scheme by a number of frames or data packets which corresponds to the value of the identification number.

FIG. 9, for instance, shows the situation for all masking values (frameMask) having a bit width of 5 bits. If all values of the marking values and the identification number (frameID) are admissible, different possibilities come about for distributing time slots to the different modules 3.

The method according to the present invention for transmitting data does not assume that the Ethernet will be used as the physical transmission medium. Moreover, the method according to the present invention is also not restricted to XCP as the useful data protocol. In principle, the data transmission method according to the present invention may be used on every physical transmission medium on which full duplex operation is possible.

In an example embodiment, the comparison value is formed by a logical linking of the data packet number (frame number) included in the received data packet with a masking value (frameMask) configured in module 3.

In an alternative example embodiment, the comparison value is formed by the data packet number itself. In this specific embodiment, a list of numbers is stored in module 3. The data packet number of the arriving data packet is compared by module 3 with all entries in this list. In response to agreement of the data packet number with one of the stored numbers, useful data are appended to the received data packet or embedded in it by module 3, for generating an extended data packet.

What is claimed is:

1. A method for transmitting data between electronic processing modules that are serially connected to one another, comprising:
   transmitting a data packet having a unique data packet number from a first module to a second module;
   forming, using a processor in the second module, a comparison value as a function of the unique data packet number; and
   embedding, using a processor of the second module, useful data of the second module in the data packet received by the second module, if the comparison value formed as a function of the unique data packet number agrees with an identification number provided in the second module;
   wherein the modules that are serially connected to one another form a module chain which is connected to a data processing unit, which processes the data transmitted in the data packets, and wherein the module of the module chain that is farthest removed from the data processing unit has a data packet generator which periodically generates empty data packets that contain no useful data.

2. The method according to claim 1, wherein a frequency, at which the data packet generator of the last module generates the empty data packets, is set so that it is equal to or greater than a highest measured data rate occurring in the modules of the module chain.

3. The method according to claim 1, wherein the data packets generated by the data packet generator have in each case management data having a respective unique data packet number of the data packet.

4. The method according to claim 1, wherein the data packet generator continuously numbers through the generated empty data packets.

5. The method according to claim 1, wherein the data processing unit transmits data packets, which include output data and actuating data as useful data, to the modules of the module chain.

6. The method according to claim 5, wherein each module of the module chain recognizes the data packets respectively destined for the module with the aid of the management data of the data packets transmitted by the data processing unit to the module, and decouples the useful data contained in them.

* * * * *